US006892929B2

(12) United States Patent
Yablochnikov

(10) Patent No.: US 6,892,929 B2
(45) Date of Patent: May 17, 2005

(54) YOKE STRUCTURE THAT IS ADAPTED TO BE SECURED TO A TUBE USING MAGNETIC PULSE WELDING TECHNIQUES

(75) Inventor: Boris A. Yablochnikov, Toledo, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 161 days.

(21) Appl. No.: 10/382,109

(22) Filed: Mar. 5, 2003

(65) Prior Publication Data

US 2003/0192880 A1 Oct. 16, 2003

Related U.S. Application Data

(60) Provisional application No. 60/362,150, filed on Mar. 6, 2002.

(51) Int. Cl.[7] .............................................. B23K 20/00
(52) U.S. Cl. ....................................................... 228/115
(58) Field of Search .................. 228/115; 219/600–607, 219/615–617

(56) References Cited

U.S. PATENT DOCUMENTS

| | | |
|---|---|---|
| 2,341,084 A | 2/1944 | Dodge |
| 2,478,890 A | 8/1949 | Barager |
| 3,092,165 A | 6/1963 | Harvey |
| 3,214,511 A | 10/1965 | Franklin |
| 3,417,456 A | 12/1968 | Carlson |

(Continued)

FOREIGN PATENT DOCUMENTS

FR            2450145        9/1980

OTHER PUBLICATIONS

Yablochnikov, B., "Apparatus for Magnetic Pulse Welding Large Diameter Thin–Walled Pipes", AVT. Svarka, No. 4, pp. 48–51, 58, 1983.

Kojima et al., "Effect of Collision Angle on the Result of Electromagnetic Welding of Aluminum", Transactions of the Japan Welding Society, vol. 20, No. 2, pp. 36–42, Oct., 1989.

Karpouhin et al., "Magnetic Pulse Welding", International Conference on the Joining of Materials, Helsingr, Denmark, pp. 241–245, May, 1991.

(Continued)

Primary Examiner—Kiley S. Stoner
(74) Attorney, Agent, or Firm—MacMillan, Sobanski & Todd, LLC

(57) ABSTRACT

A magnetic pulse welding operation is performed to secure first and second metallic components together, such as a yoke and a driveshaft tube in a vehicular driveshaft assembly. The yoke includes a first portion, such as a body portion, and a second portion, such as a pair of opposed yoke arms, that are separated by a bridge portion. The end of the driveshaft tube is disposed co-axially about the body portion of the yoke, and a magnetic pulse welding operation is performed to secure the end of the driveshaft tube to the body portion of the yoke. The bridge portion can be defined by a groove formed in either the outer surface or the inner surface of the yoke. The groove may have side portions that extend either generally perpendicular or are angled or tapered relative to an axis of rotation of the yoke. If desired, a pair of opposed, semi-circular grooves may be formed in the yoke to define the bridge portion. The bridge portion allows the yoke arms to be elastically deformed and can also limit the propagation of shock waves through the yoke that can result from the performance of the magnetic pulse welding operation.

10 Claims, 4 Drawing Sheets

U.S. PATENT DOCUMENTS

| | | |
|---|---|---|
| 3,520,049 A | 7/1970 | Lysenko et al. |
| 3,528,596 A | 9/1970 | Carlson |
| 3,961,739 A | 6/1976 | Leftheris |
| 3,992,120 A | 11/1976 | Recker |
| 4,067,216 A | 1/1978 | Khimenko et al. |
| 4,129,846 A | 12/1978 | Yablochnikov |
| 4,469,356 A | 9/1984 | Duret et al. |
| 4,504,714 A | 3/1985 | Katzenstein |
| 4,513,188 A | 4/1985 | Katzenstein |
| 4,523,872 A | 6/1985 | Arena et al. |
| 4,551,118 A | 11/1985 | Spisz |
| 4,702,543 A | 10/1987 | Hager |
| 4,789,094 A | 12/1988 | Chudakov |
| 4,807,351 A | 2/1989 | Berg et al. |
| 4,930,204 A | 6/1990 | Schurter |
| 4,990,732 A | 2/1991 | Dudko et al. |
| 5,222,915 A | 6/1993 | Petrzelka et al. |
| 5,318,374 A | 6/1994 | Rumberger |
| 5,716,276 A | 2/1998 | Mangas et al. |
| 5,813,264 A | 9/1998 | Steingroever |
| 5,981,921 A | 11/1999 | Yablochnikov |
| 6,438,839 B1 * | 8/2002 | Hardesty et al. ............... 29/890 |
| 6,523,876 B1 * | 2/2003 | Durand ...................... 296/35.1 |
| 6,531,688 B2 * | 3/2003 | Yablochnikov ............. 219/603 |
| 6,643,928 B2 * | 11/2003 | Hardesty et al. ............... 29/890 |
| 2002/0003159 A1 | 1/2002 | Gabbianelli et al. |

OTHER PUBLICATIONS

Hardwick et al., "Some More Recent Advances in Cladding Technology", Ninth Annual Conference on High Energy Reaction on Materials, Novosibirsk, Russia, pp. 271–274, Aug., 1986.

Noland et al., "High–Velocity Metal Working", Office of Technology Utilization, NASA, Washington, D.C., pp. 1–29, 179, 1967.

* cited by examiner

YOKE STRUCTURE THAT IS ADAPTED TO BE SECURED TO A TUBE USING MAGNETIC PULSE WELDING TECHNIQUES

CROSS REFERENCE TO RELATED APPLICATION

This application claims the benefit of U.S. Provisional Application No. 60/362,150, filed Mar. 6, 2002, the disclosure of which is incorporated herein by reference.

BACKGROUND OF THE INVENTION

This invention relates in general to the use of magnetic pulse welding techniques to secure two metallic components together, such as a yoke and a driveshaft tube in a vehicular driveshaft assembly. In particular, this invention relates to an improved structure for a yoke or similar end fitting that minimizes the amount of undesirable distortions that can result when a driveshaft tube is secured thereto by means of such a magnetic pulse welding operation.

In most land vehicles in use today, a drive train system is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube having first and second end fittings (such as tube yokes) secured to the opposed ends thereof. The first end fitting forms a portion of a first universal joint, which provides a rotatable driving connection from the output shaft of the engine/transmission assembly to the driveshaft tube while accommodating a limited amount of angular misalignment between the rotational axes of these two shafts. Similarly, the second end fitting forms a portion of a second universal joint, which provides a rotatable driving connection from the driveshaft tube to the input shaft of the axle assembly while accommodating a limited amount of angular misalignment between the rotational axes of these two shafts.

In vehicular driveshaft assemblies of this general type, it is usually necessary to permanently secure the first and second end fittings to the ends of the driveshaft tube. Traditionally, conventional welding techniques have been used to permanently join the first and second end fittings to the ends of the driveshaft tube. As is well known, conventional welding techniques involve the application of heat to localized areas of two metallic members, which results in a coalescence of the two metallic members. Such conventional welding techniques may or may not be performed with the application of pressure, and may or may not include the use of a filler metal. Although conventional welding techniques have functioned satisfactorily in the past, there are some drawbacks to the use thereof in joining the first and second end fittings to the ends of the driveshaft tube. First, as noted above, conventional welding techniques involve the application of heat to localized areas of the two metallic members. This application of heat can cause undesirable distortions and weaknesses to be introduced into the metallic components. Second, while conventional welding techniques are well suited for joining components that are formed from similar metallic materials, it has been found to be somewhat more difficult to adapt them for use in joining components formed from dissimilar metallic materials. Third, conventional welding techniques are not easily adapted for joining components that have different gauge thicknesses. Inasmuch as the production of vehicular driveshaft assemblies is usually a high volume process, it would be desirable to provide an improved method for permanently joining these metallic components together in a manner that avoids the drawbacks of conventional welding techniques.

Magnetic pulse welding is an alternative process that has been proposed to secure the first and second end fittings to the opposed ends of the driveshaft tube. To accomplish this, a hollow driveshaft tube having an end portion and an end fitting having a neck portion are initially provided. The end portion of the driveshaft tube can be hollow to allow the neck portion of the end fitting to be disposed co-axially therein. Alternatively, the neck portion of the end fitting can be hollow to allow the end portion of the driveshaft tube to be disposed telescopically therein. In either event, an annular gap is provided between the end of the driveshaft tube and the neck portion of the end fitting. Then, an electrical inductor is provided concentrically about or within the co-axially overlapping portions of the driveshaft tube and the end fitting. The inductor is energized to generate a magnetic field that either collapses the outer member inwardly into engagement with the inner member or expands the inner member outwardly into engagement with the outer member. In either event, the high velocity impact of the two members, as well as the large pressures exerted thereon, cause them to become permanently joined together.

A typical end fitting includes a body portion having a pair of opposed yoke arms that extend therefrom in a first axial direction. A pair of aligned openings are formed through the yoke arms and are adapted to receive conventional bearing cups of the universal joint cross therein. A generally hollow neck portion extends axially in a second axial direction from the body portion. To perform the magnetic pulse welding operation, an end portion of the driveshaft tube is installed onto co-axially about the neck portion of the end fitting. When the driveshaft tube and the end fitting are assembled in this manner, an annular gap or space is defined between the inner surface of the end portion of the driveshaft tube and outer surface of the neck portion of the end fitting. An electrical inductor is then disposed about the assembly of the driveshaft tube and the end fitting. The inductor is energized to generate an immense and momentary electromagnetic field about the end portion of the driveshaft tube. This electromagnetic field exerts a very large force on the outer surface of the end portion of the driveshaft tube, causing it to collapse inwardly at a high velocity onto the neck portion of the end fitting. The resulting impact of the inner surface of the end portion of the driveshaft tube with the outer surface of the neck portion of the end fitting causes a weld or molecular bond to occur therebetween.

Unfortunately, it has been found that the high velocity impact of the end portion of the driveshaft tube onto the neck portion of the end fitting during the magnetic pulse welding operation can, in some instances, cause the yoke arms of the end fitting to be permanently deflected relative to one another. For example, if the end portion of the driveshaft tube is collapsed upon the neck portion of the end fitting, the inward deformation of the neck portion can cause the yoke arms on the other end of the end fitting to spread outwardly apart from one another. Also, the shock wave propagated through the end fitting as a result of this impact can slightly enlarge the dimensions of the openings formed through the yoke arms. These events are particularly likely to occur when the end fitting is formed from a relatively lightweight material, such as an alloy of aluminum. Such deflections of the yoke arms are undesirable because they can result in the misalignment of the respective openings formed therethrough. When the openings formed through the yoke arms are not precisely aligned, it may be relatively difficult to properly install the remaining portions of the universal joint thereon and to balance the universal joint for rotation. Thus, it would be desirable to provide an improved structure for a yoke or similar end fitting that minimizes the amount of undesirable deflections that can result when a driveshaft tube is secured thereto by means of such a magnetic pulse welding operation.

SUMMARY OF THE INVENTION

This invention relates to an improved structure for a yoke or similar end fitting that minimizes the amount of undesirable distortions that can result when a driveshaft tube is secured thereto by means of such a magnetic pulse welding operation. The yoke includes a first portion, such as a body portion, and a second portion, such as a pair of opposed yoke arms, that are separated by a bridge portion. The end of the driveshaft tube is disposed co-axially about the body portion of the yoke, and a magnetic pulse welding operation is performed to secure the end of the driveshaft tube to the body portion of the yoke. The bridge portion can be defined by a groove formed in either the outer surface or the inner surface of the yoke. The groove may have side portions that extend either generally perpendicular or are angled or tapered relative to an axis of rotation of the yoke. If desired, a pair of opposed, semi-circular grooves may be formed in the yoke to define the bridge portion. The bridge portion allows the yoke arms to be elastically deformed and can also limit the propagation of shock waves through the yoke that can result from the performance of the magnetic pulse welding operation.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
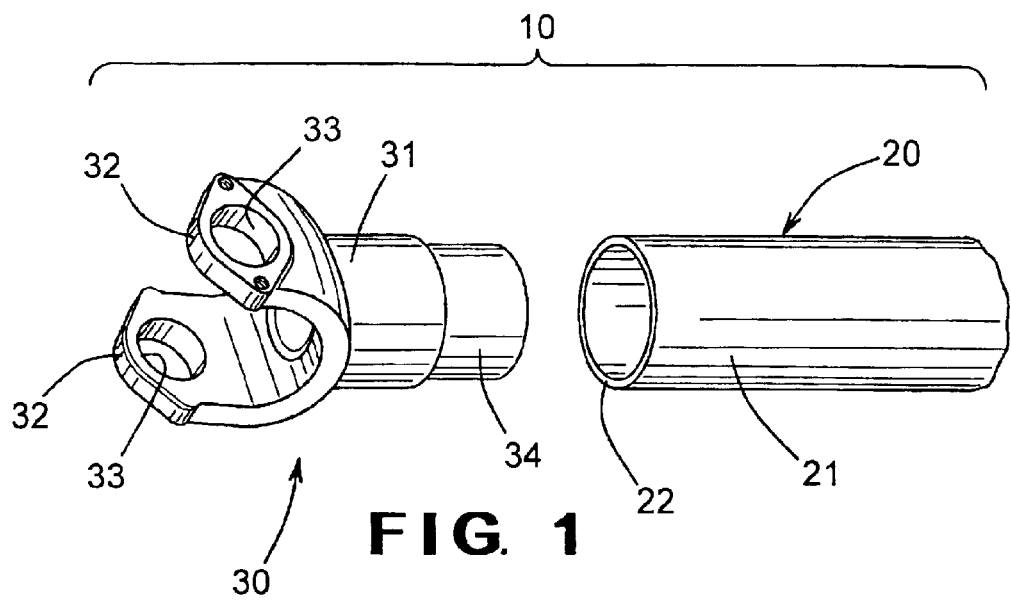
FIG. 1 is an exploded perspective view of a first embodiment of an end fitting and a driveshaft tube shown prior to being assembled and secured together by means of a magnetic pulse welding operation in accordance with this invention.
Figure 2:
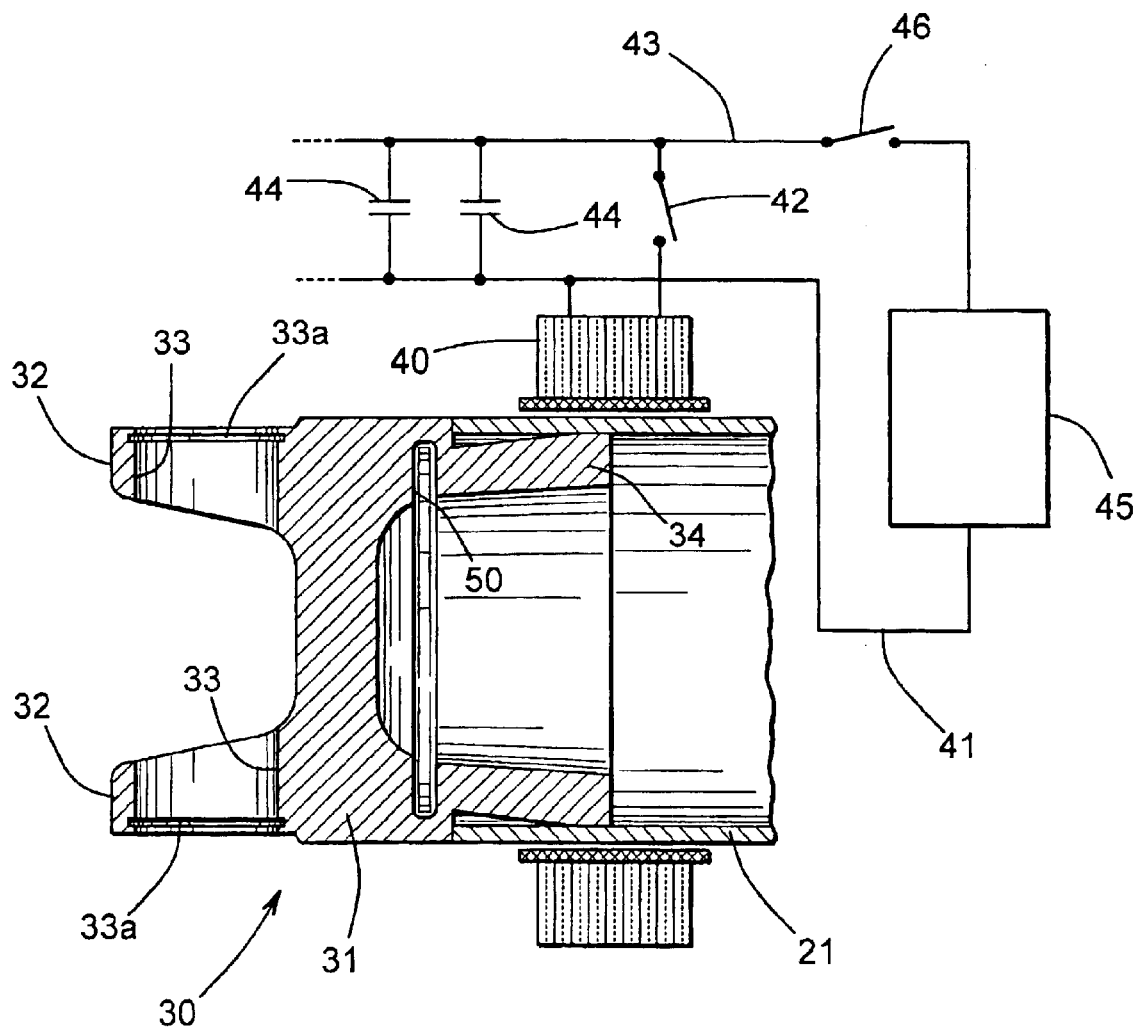
FIG. 2 is an enlarged sectional elevational view of the first embodiment of the end fitting and the driveshaft tube illustrated in FIG. 1 shown assembled and disposed within an inductor for performing the magnetic pulse welding operation.

Referring now to the drawings, there is illustrated in FIGS. 1 and 2 a portion of a vehicular driveshaft assembly 10 that includes a driveshaft tube, indicated generally at 20, and a first embodiment of an end fitting, indicated generally at 30. Although this invention will be described and illustrated in the context of securing an end fitting to a driveshaft tube to form a portion of a vehicular driveshaft assembly, it will be appreciated that the method of this invention can be used to secure any two metallic components together for any desired purpose or application.

The illustrated driveshaft tube 20 is generally hollow and cylindrical in shape and can be formed from any desired metallic material, such as 6061 T6 aluminum alloy, for example. Preferably, the driveshaft tube 20 has an outer surface that defines a substantially constant outer diameter and an inner surface that defines a substantially constant inner diameter. Thus, the illustrated driveshaft tube 20 has a substantially cylindrical and uniform wall thickness, although such is not required. The driveshaft tube 20 has an end portion 21 that terminates at an end surface 22.

The illustrated end fitting 30 is a tube yoke formed from a metallic material that can be either the same as or different from the metallic material used to form the driveshaft tube 20, such steel or an alloy of aluminum, for example. The end fitting 30 includes a body portion 31 having a pair of opposed yoke arms 32 that extend therefrom in a first axial direction. A pair of aligned openings 33 are formed through the yoke arms 32 and are adapted to receive conventional bearing cups (not shown) of a universal joint cross therein. If desired, an annular groove 33a (see FIGS. 2 and 3) can be formed within each of the openings 33 to facilitate retention of the bearing cups therein in a known manner by means of respective snap rings (not shown). A generally hollow neck portion 34 extends axially in a second axial direction from the body portion 31. The structure of the neck portion 34 is described in detail in co-pending application Ser. No. 60/362,215, filed Mar. 6, 2002, which is owned by the assignee of this invention. The disclosure of that application is incorporated herein by reference.

FIG. 2 also illustrates an inductor 40 disposed about the assembly of the driveshaft tube 20 and the first embodiment of the end fitting 30 prior to the performance of a magnetic pulse welding operation for securing the two components together in accordance with the method of this invention. The inductor 40 can be formed having any desired structure, such as that shown and described in U.S. Pat. No. 4,129,846 to Yablochnikov. The disclosure of that patent is incorporated herein by reference. The inductor 40 is connected to a schematically illustrated control circuit for selectively operating same. As shown in FIG. 2, a first end of the inductor 40 is connected to a first electrical conductor 41, while a second end of the inductor 40 is connected through a discharge switch 42 to a second electrical conductor 43. A plurality of high voltage capacitors 44 or similar energy storage devices are connected between the first and second electrical conductors 41 and 43. The first electrical conductor 41 is also connected to a source of electrical energy 45, while the second electrical conductor 43 is connected through a charging switch 46 to the source of electrical energy 45. The structure and operation of the control circuit is described in detail in U.S. Pat. No. 5,981,921 to Yablochnikov, and the disclosure of that patent is also incorporated herein by reference.

The operation of the inductor 40 to perform the magnetic pulse welding operation is well known in the art, and reference is again made to the above-referenced U.S. Pat. No. 5,981,921 to Yablochnikov for a detailed explanation. Briefly, however, the inductor 40 is operated by initially opening the discharge switch 42 and closing the charging switch 46. This allows electrical energy to be transferred from the source of electrical energy 45 to each of the capacitors 44. When the capacitors 44 have been charged to a predetermined voltage, the charging switch 46 is opened. Thereafter, when it is desired to operate the inductor 40, the discharge switch 42 is closed. As a result, a high energy pulse of electrical current flows from the capacitors 44 through the inductor 40, thereby generating an immense and momentary electromagnetic field about the end portion 21 of the driveshaft tube 20. This electromagnetic field exerts a very large force on the outer surface of the end portion 21 of the driveshaft tube 20, causing it to collapse inwardly at a high velocity onto the neck portion 34 of the end fitting 30. The resulting impact of the inner surface of the end portion 21 of the driveshaft tube 20 with the outer surface of the neck portion 34 of the end fitting 30 causes a weld or molecular bond to occur therebetween. The size and location of the weld region will vary with a variety of factors, such as the size of the gap 36, the size, shape, and nature of the metallic materials used to form the driveshaft tube 20 and the end fitting 30, the size and shape of the inductor 40, the angle and velocity of the impact between the end portion 21 of the driveshaft tube 20 and the neck portion 34 of the end fitting 30, and the like.

As discussed above, it has been found that the high velocity impact of the end portion 21 of the driveshaft tube 20 onto the neck portion of a conventional end fitting during the magnetic pulse welding operation can, at least in some instances, cause the yoke arms of the end fitting to be permanently deflected relative to one another. This occurs because the body portion of a conventional end fitting can be plastically deformed as a result of the impact of the end portion 21 of the driveshaft tube 20 on the neck portion. This is particularly likely to occur when the end fitting is formed from a relatively lightweight material, such as an alloy of aluminum. Also, this high velocity impact can cause shock waves to propagate through a conventional end fitting from the neck portion to the yoke arms that can result in some distortion of the shape of the aligned openings formed therethrough.

Figure 3:
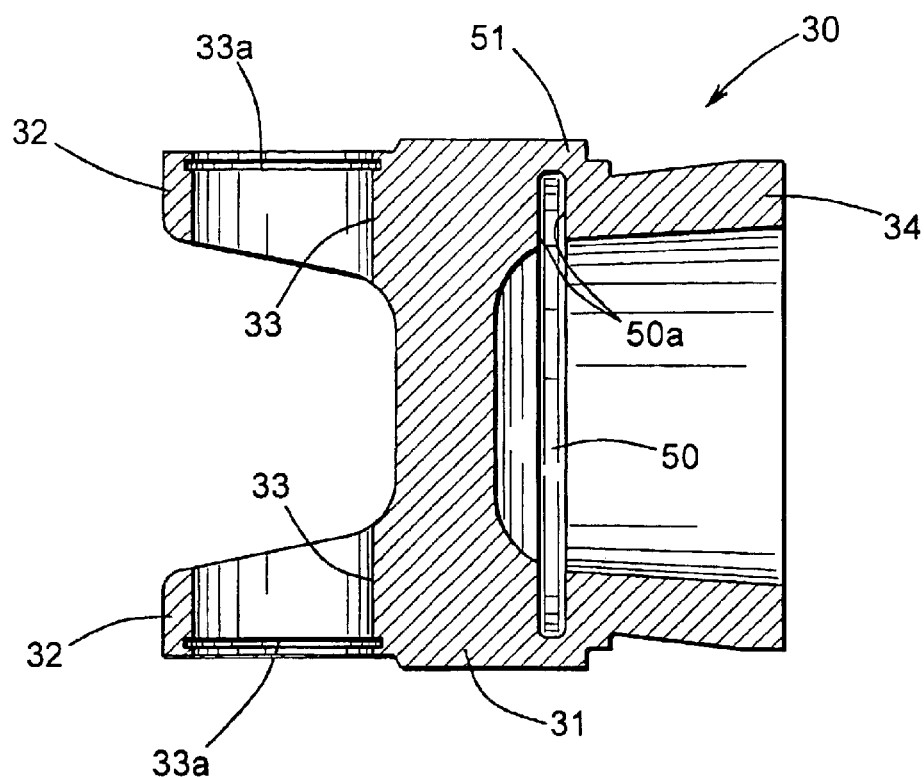
FIG. 3 is a further enlarged sectional elevational view of the first embodiment of the end fitting illustrated in FIGS. 1 and 2.

To reduce or prevent this from occurring, an annular groove 50 or other recessed area is formed on the interior of the end fitting 30, as shown in FIGS. 2 and 3. The illustrated groove 50 is generally circular in shape, having side portions 50a that extend generally perpendicular to the axis of rotation of the end fitting 30. The illustrated groove 50 is formed in the body portion 31 near the location where the neck portion 34 extends axially therefrom. However, the groove 50 may be formed at any desired location in the end fitting 30 and may have any desired shape. The purpose of the groove 50 is to define a bridge portion 51 in the end fitting 30 that is composed of a relatively small volume of material. As a result, the bridge portion 51 provides a region between the neck portion 34 and the yoke arms 32 in the end fitting 30 that is more flexible in the axial direction than is typically present in conventional end fittings. However, the groove 50 is preferably sized and shaped so as to not adversely affect the ability of the end fitting 30 to transmit torque and rotational energy during use. The depth and width of the groove 50 (and, therefore, the size and flexibility of the bridge portion 51) can vary with the particular characteristics of the end fitting 30 and the mechanical properties that are deemed to be necessary or desirable.

The flexible nature of the bridge portion 51 allows the yoke arms 32 of the end fitting 30 to be elastically deformed when the magnetic pulse welding operation described above is performed on the neck portion 34. Consequently, the groove 50 and the bridge portion 51 reduce or prevent the amount of undesirable permanent deflections of the yoke arms 32 that can result from the performance of the magnetic pulse welding operation on the neck portion 34. The groove 50 and the bridge portion 51 can also limit the propagation of shock waves through the end fitting 30 from the neck portion 34 to the yoke arms 32 that can result from the performance of the magnetic pulse welding operation. Such shock waves can, at least in some instances, undesirably alter the shape of respective openings 33 formed through the yoke arms 32.

Figure 4:
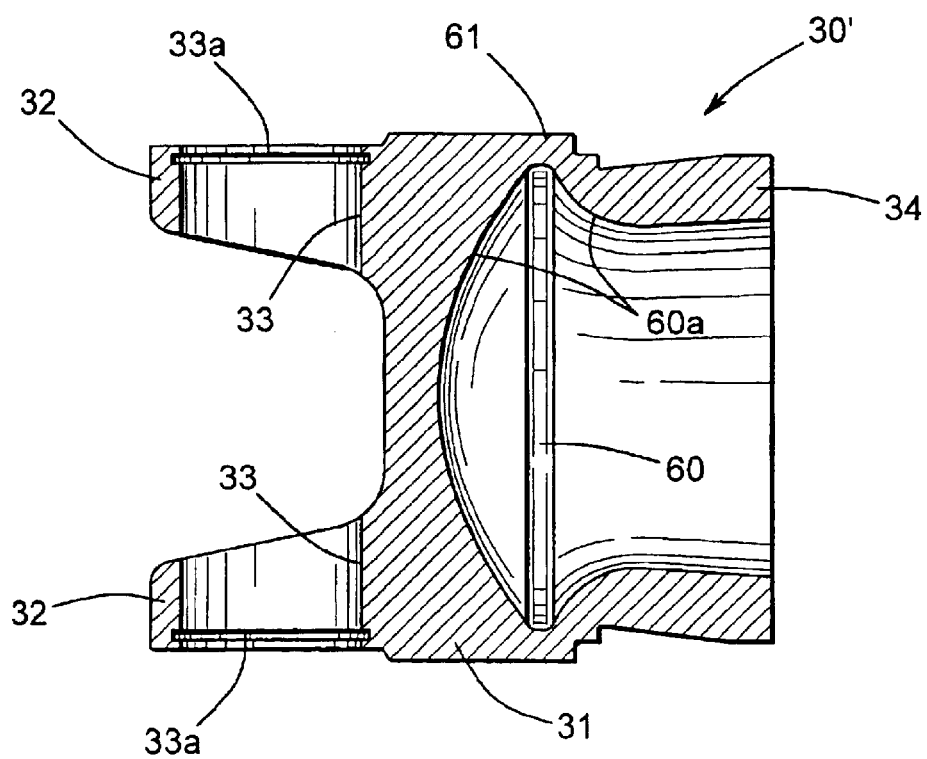
FIG. 4 is an enlarged sectional elevational view similar to FIG. 3 showing a second embodiment of the end fitting in accordance with this invention.

FIG. 4 is an enlarged sectional elevational view similar to FIG. 3 showing a 20 second embodiment of the end fitting, indicated generally at 30', in accordance with this invention. The second embodiment of the end fitting 30' is generally similar to the first embodiment of the end fitting 30 described above, and like reference numbers are used to illustrate similar structures therein. However, the modified end fitting 30' has a modified groove 60 formed therein. The modified groove 60 is also generally circular in shape. However, the modified groove 60 has side portions 60a that are angled or tapered relative to the axis of rotation of the modified end fitting 30'. Such side portions 60a can be angled or tapered at either a varying angle as illustrated or at a constant angle, in the nature of a triangularly shaped groove, as desired. The net result of the modified groove 60 is that additional material is removed from the body portion 31 of the modified end fitting 30'. Thus, the modified groove defines a bridge portion 61 that is more flexible than the bridge portion 51 described above.

Figure 5:
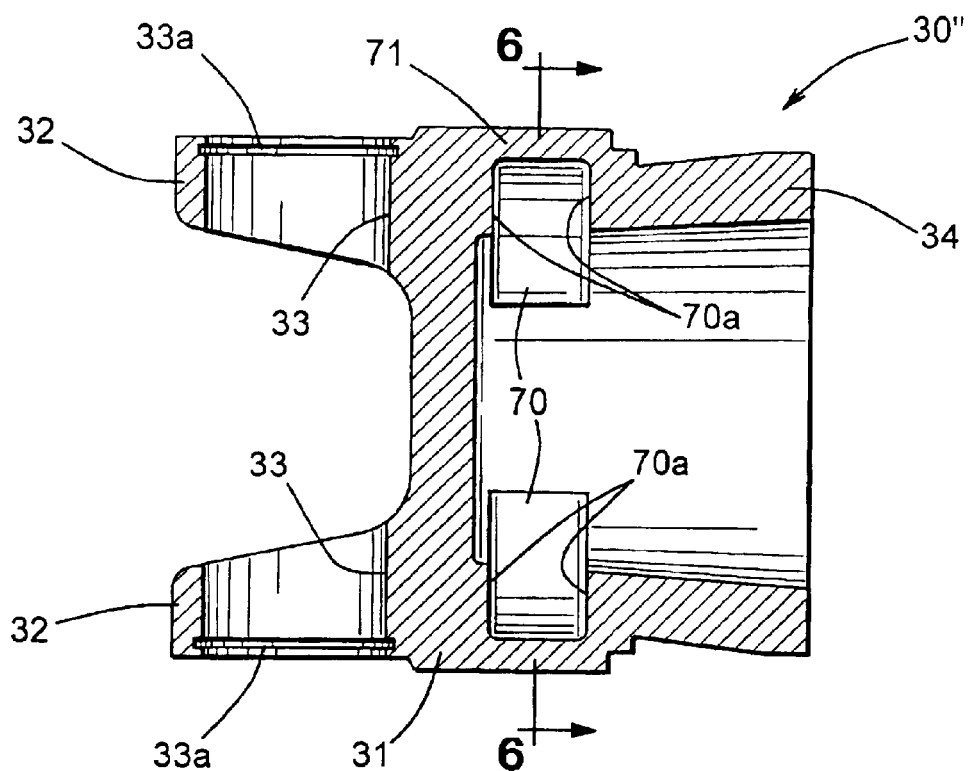
FIG. 5 is an enlarged sectional elevational view similar to FIG. 3 showing a third embodiment of the end fitting in accordance with this invention.
Figure 6:
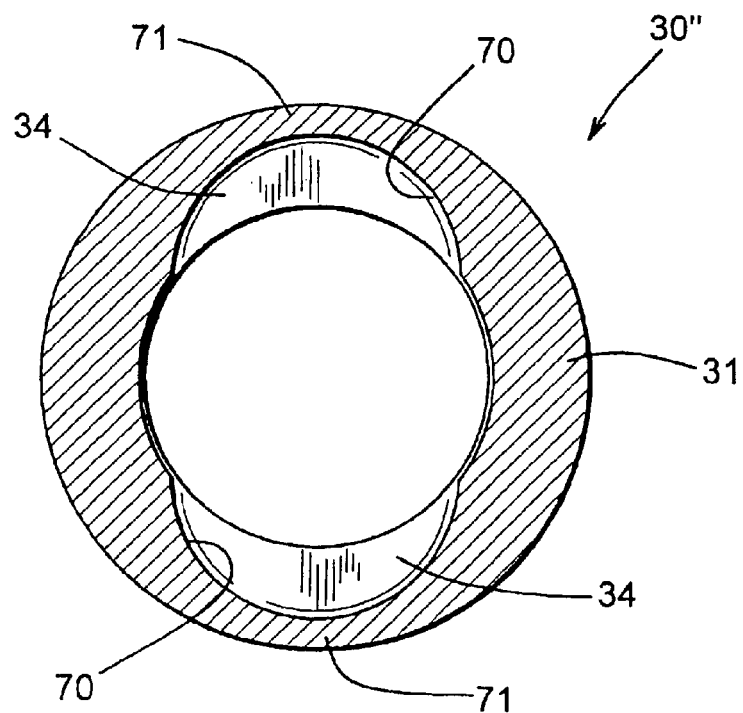
FIG. 6 is a sectional elevational view of the third embodiment of the end fitting taken along line 6—6 of FIG. 5.

FIG. 5 is an enlarged sectional elevational view similar to FIG. 3 showing a third embodiment of the end fitting, indicated generally at 30", in accordance with this invention. The third embodiment of the end fitting 30" is generally similar to the first embodiment of the end fitting 30 described above, and like reference numbers are used to illustrate similar structures therein. However, the modified end fitting 30" has a pair of modified grooves 70 formed therein. The modified grooves 70 are opposed to one another and are each generally semi-circular in shape, as best shown in FIG. 6, having side portions 70a that extend generally perpendicular to the axis of rotation of the end fitting 30". However, such side portions 70a may, if desired, be angled or tapered relative to the axis of rotation of the modified end fitting 30" as discussed above. The two grooves 70 are preferably axially aligned with the yoke arms 32 of the modified end fitting 30" as shown in FIG. 5, although such is not required. Thus, the modified grooves 70 define an oval-shaped recess having a major axis that is parallel to the axis of alignment of the aligned openings 33 formed through the yoke arms 32 of the modified end fitting 30" and having a minor axis that is perpendicular to the axis of alignment of such aligned openings 33. Accordingly, the modified grooves 70 define respective bridge portions 71 that are also axially aligned with the yoke arms 32.

Figure 7:
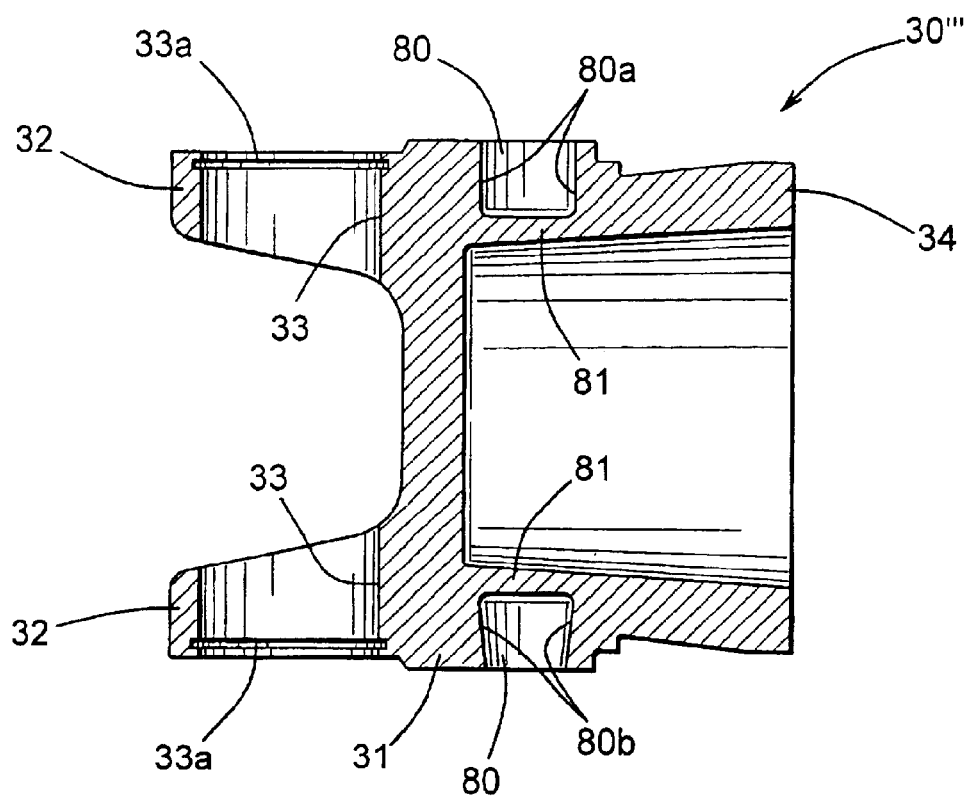
FIG. 7 is an enlarged sectional elevational view similar to FIG. 3 showing a fourth embodiment of the end fitting in accordance with this invention.
Figure 8:
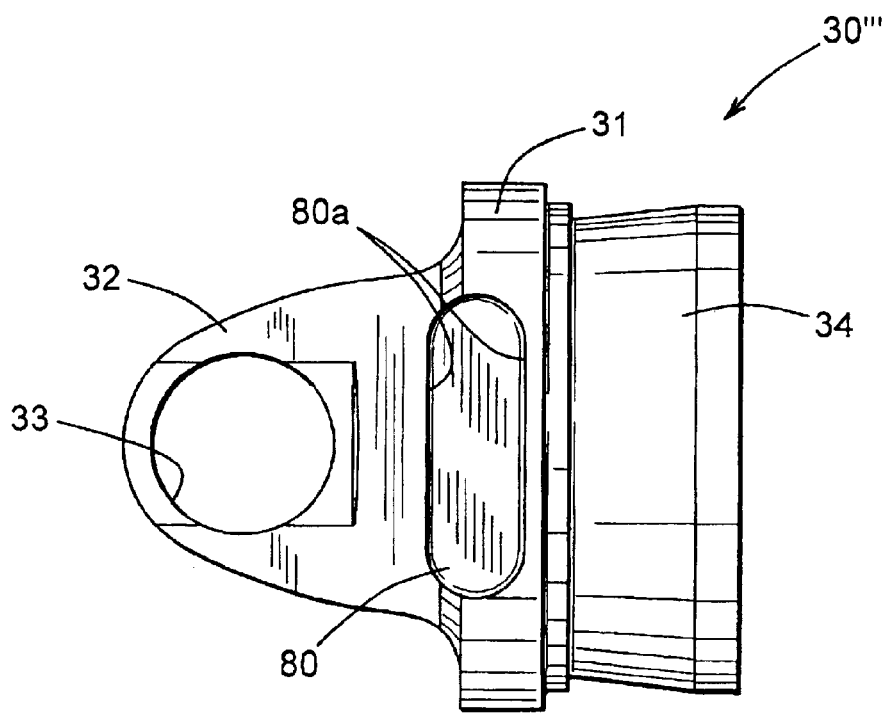
FIG. 8 is a top plan view of the fourth embodiment of the end fitting illustrated in FIG. 7.

FIG. 7 is an enlarged sectional elevational view similar to FIG. 3 showing a fourth embodiment of the end fitting, indicated generally at 30'", in accordance with this invention. The fourth embodiment of the end fitting 30'" is generally similar to the first embodiment of the end fitting 30 described above, and like reference numbers are used to illustrate similar structures therein. However, the modified end fitting 30'" has a pair of grooves 80 formed in the outer surface of the body portion 31. The modified grooves 80 are opposed to one another and are generally oval in shape, as best shown in FIG. 8, and can have side portions 80a that extend generally perpendicular to the axis of rotation of the end fitting 30''' or side portions 80b that are angled or tapered relative to the axis of rotation of the modified end fitting 30''' as desired. The two grooves 80 are preferably axially aligned with the yoke arms 32 of the modified end fitting 30''' as shown in FIG. 7, although such is not required. Thus, the modified grooves 80 define respective interior bridge portions 81 that are also axially aligned with the yoke arms 32. Although this invention contemplates a single annular groove external groove extending about the outer surface of the body portion 31 of the modified end fitting 30''', it has been found that such an annular external groove may undesirably weaken the modified end fitting 30'''.

All of the various grooves 50, 60, 70, and 80 can be formed in the associated end fittings in any desired manner. For example, such grooves 50, 60, 70, and 80 can be formed at the time the end fittings are manufactured, such as by casting. Alternatively, such grooves 50, 60, 70, and 80 can be formed after the end fittings are manufactured, such as by machining. After the magnetic pulse welding process has been performed, any or all of such grooves 50, 60, 70, and 80 can be filled with a filler material, such as an epoxide resin, to restore some or all of the rigidity of the end fitting that was lost by virtue of the grooves 50, 60, 70, and 80 or for any other purpose, such as to balance the end fitting for rotation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of performing a magnetic pulse welding operation to secure a metallic yoke and a metallic component together comprising the steps of:
   (a) providing a metallic yoke including a body portion and a pair of opposed yoke arms that are separated by a bridge portion;
   (b) providing a metallic component having an end;
   (c) disposing the end of the metallic component in an axially overlapping manner relative to the body portion of the metallic yoke; and
   (d) performing a magnetic pulse welding operation to secure the end of the metallic component to the body portion of the metallic yoke.

2. The method defined in claim 1 wherein said step (a) is performed by providing a groove in the metallic yoke that defines the bridge portion.

3. The method defined in claim 2 wherein said step (a) is performed by providing a groove in an outer surface of the metallic yoke that defines the bridge portion.

4. The method defined in claim 2 wherein said step (a) is performed by providing a groove in an inner surface of the metallic yoke that defines the bridge portion.

5. The method defined in claim 2 wherein said step (a) is performed by providing a groove that having side portions that extend generally perpendicular relative to an axis of rotation of the metallic yoke.

6. The method defined in claim 2 wherein said step (a) is performed by providing a groove that having side portions that are angled or tapered relative to an axis of rotation of the metallic yoke.

7. The method defined in claim 1 wherein said step (a) is performed by providing a pair of grooves in the metallic yoke that defines the bridge portion.

8. The method defined in claim 7 wherein said step (a) is performed by providing a pair of grooves that are opposed to one another and are each generally semi-circular in shape.

9. The method defined in claim 7 wherein said step (a) is performed by providing a pair of grooves in an outer surface of the metallic yoke that defines the bridge portion.

10. The method defined in claim 7 wherein said step (a) is performed by providing a pair of grooves in an inner surface of the metallic yoke that defines the bridge portion.

* * * * *